Feb. 27, 1923.  1,446,644
E. G. ESCHENFELDER
INNER TUBE FOR PNEUMATIC TIRES
Filed Jan. 18, 1922
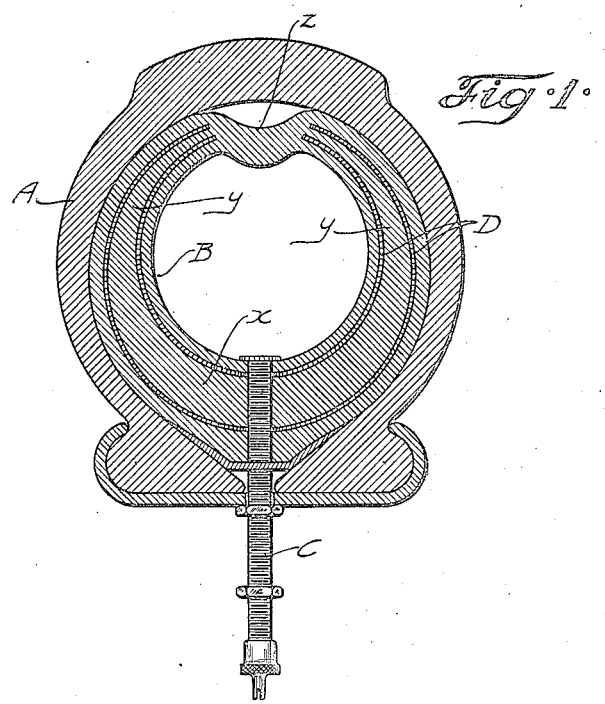
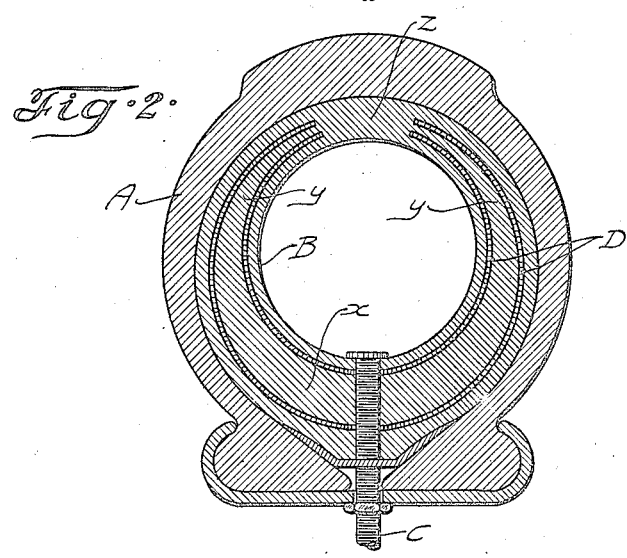
INVENTOR
Eugene G. Eschenfelder.
By Bakewell & Church
ATTORNEYS Patented Feb. 27, 1923.

1,446,644

UNITED STATES PATENT OFFICE.

EUGENE G. ESCHENFELDER, OF WATERLOO, ILLINOIS.

INNER TUBE FOR PNEUMATIC TIRES.

Application filed January 18, 1922. Serial No. 530,127.

*To all whom it may concern:*

Be it known that I, EUGENE G. ESCHENFELDER, a citizen of the United States, residing at Waterloo, Illinois, have invented a certain new and useful Improvement in Inner Tubes for Pneumatic Tires, of which the following is a full, clear, and exact description, such as will enable others skilled in the art to which it appertains to make and use the same.

This invention relates to pneumatic tire inner tubes of the kind that consist of a relatively thick elastic tube of such cross sectional shape that when it is inflated portions of the tube will be under compression, and accordingly, will be in a condition to automatically seal or close up a puncture or hole that develops in the tube when the tire is in service.

One object of my invention is to provide an inner tube of the general type referred to which is so constructed that the portion of the tube through which the valve stem passes is the strongest part of the tube and is not liable to become cut or damaged by wrinkling or abnormal deflection when the tube is placed under transverse compression by inflating the same.

Another object is to provide a self-sealing, elastic inner tube for pneumatic tires that is equipped with an inelastic reinforcing element arranged in such a manner that it will not interfere with the movement of the inwardly bowed portion of the tube that effects the transverse compression of the tube when it is filled with air.

Figure 1 of the drawings is a transverse sectional view of my improved tube, showing it deflated and arranged inside of the casing of a pneumatic tire.

Figure 2 is a similar view, showing the inner tube inflated.

Referring to the drawings, which illustrate the preferred form of my invention, A designates the casing of a pneumatic tire and B designates an inner tube that is arranged inside of said casing. The tube B is formed of any suitable molded elastic material, such as rubber or a rubber composition, and it is provided at its inner side with a thick portion $x$ that merges into two side wall portions $y$ of gradually diminishing thickness whose outer ends merge into a portion $z$ at the outer side or tread portion side of the tube that is bowed inwardly, as shown in Figure 1, when the tube is deflated. The function of the portion $z$ is to compress the side wall portions of the tube when the tube is inflated, and therefore, I will refer to said portion $z$ as a compressing element. It may be formed in various ways without departing from the spirit of my invention, but it usually consists of a section at the outer side of the tube arranged between the side wall portions and of such length and thickness that it will deflect or bow inwardly slightly, as shown in Figure 1, when the tube is deflated, and will bow outwardly and exert pressure on the side wall portions in a direction tending to compress said side wall portions and also the portion $x$ at the inner side of the tube when the tube is filled with air.

Owing to the fact that the valve stem C is connected to the portion $x$ of the tube, which is of maximum thickness and of greater thickness than the tread portion and side wall portions, there is no liability of the tube pulling away from the valve stem or becoming damaged by wrinkling at the point where the valve stem is connected to same, as so often occurs in self-sealing inner tubes of the kind heretofore in use, wherein the valve stem was connected to a relatively thin portion at the inner side of the tube.

If desired, the tube may be reinforced and strengthened by one or more elements imbedded in the tube and formed of material that will tend to prevent a nail or other sharp pointed device that passes through the casing A of the tire from passing completely through the inner tube. In the form of my invention herein illustrated the tube B is equipped with a plurality of layers of fabric D imbedded in the rubber or other elastic material from which the tube is formed and arranged in such a way that they tend to make the tube puncture proof, without, however, interfering with the flexing of the compressing element $z$ of the tube. As shown in the drawings, the reinforcing elements D are imbedded in the inner portion $x$ and in the side wall portion $y$ of the tube and terminate at opposite sides of the outer portion $z$ of the tube, thus permitting said outer portion $z$ to flex inwardly when the tube is deflated and flex outwardly when the tube is inflated.

While I prefer to equip the tube with one or more reinforcing elements D of the kind above referred to, I wish it to be understood that my invention is not limited to an inner tube equipped with a reinforcing element imbedded in the material from which the tube is formed, as my broad idea consists of an inner tube for pneumatic tires that is of maximum thickness at the inner side of the tube and which is provided at its outer side with a portion of such form and arrangement that it will cause the side wall portions and inner portion of the tube to be placed under transverse compression when the tube is inflated.

Having thus described my invention, what I claim as new and desire to secure by Letters Patent is:

1. An inner tube for pneumatic tires provided at its inner side with a thick valve stem portion and at its outer side with a thin portion that bows inwardly when the tube is deflated and which bows outwardly when the tube is inflated, and a reinforcing element imbedded in the material of which the tube is formed and terminating at opposite sides of said thin outer portion.

2. An inner tube for pneumatic tires provided at its inner side with a thick portion that merges in side wall portions of gradually diminishing thickness whose ends are connected together by a compressing element at the outer side of the tube which flexes inwardly when the tube is deflated and which flexes outwardly when the tube is inflated, and an inelastic element imbedded in the inner portion and side wall portions of the tube and terminating at opposite sides of said compressing element.

EUGENE G. ESCHENFELDER.